United States Patent [19]
Dahl et al.

[11] 3,884,020
[45] May 20, 1975

[54] LEAF SHREDDING MEANS FOR ROTARY MOWERS

[75] Inventors: Einar S. Dahl; Earl H. Kidd, both of Galesburg, Ill.

[73] Assignee: Outboard Marine Corporation, Waukegan, Ill.

[22] Filed: Oct. 11, 1973

[21] Appl. No.: 405,447

[52] U.S. Cl. ............................................... 56/320.2
[51] Int. Cl. ............................................. A01d 67/00
[58] Field of Search ........ 56/320.2, 255, 17.5, 12.8, 56/12.9, 13.8

[56] References Cited
UNITED STATES PATENTS

| | | | |
|---|---|---|---|
| 2,659,191 | 11/1953 | Miller et al. | 56/12.9 |
| 2,791,080 | 5/1957 | Shaw | 56/320.2 |
| 2,983,096 | 5/1961 | Phelps | 56/255 |
| 3,118,267 | 1/1964 | Shaw | 56/17.5 |
| 3,242,660 | 3/1966 | Gary | 56/13.8 |
| 3,531,923 | 10/1970 | DeLay | 56/12.8 |

Primary Examiner—Russell R. Kinsey
Attorney, Agent, or Firm—Michael, Best & Friedrich

[57] ABSTRACT

Disclosed herein is a rotary mower including a screen attachment which is detachably mounted inside the blade housing and extends transversely of the opening of the discharge outlet through which material is being discharged from the interior of the blade housing. Larger-sized material, such as leaves, being impelled by the cutter blade towards the discharge outlet is forced through the screen and is thereby shredded to a smaller particle size suitable for mulching purposes. If the mower includes both a top discharge outlet and a side discharge outlet, such a screen attachment is provided for each outlet, so that the shredded material can either be collected or dispersed over the lawn. The screen attachments are preferably supported from the margin of the opening of the respective discharge outlet so they can be conveniently installed and removed through the top discharge opening in the blade housing.

10 Claims, 5 Drawing Figures

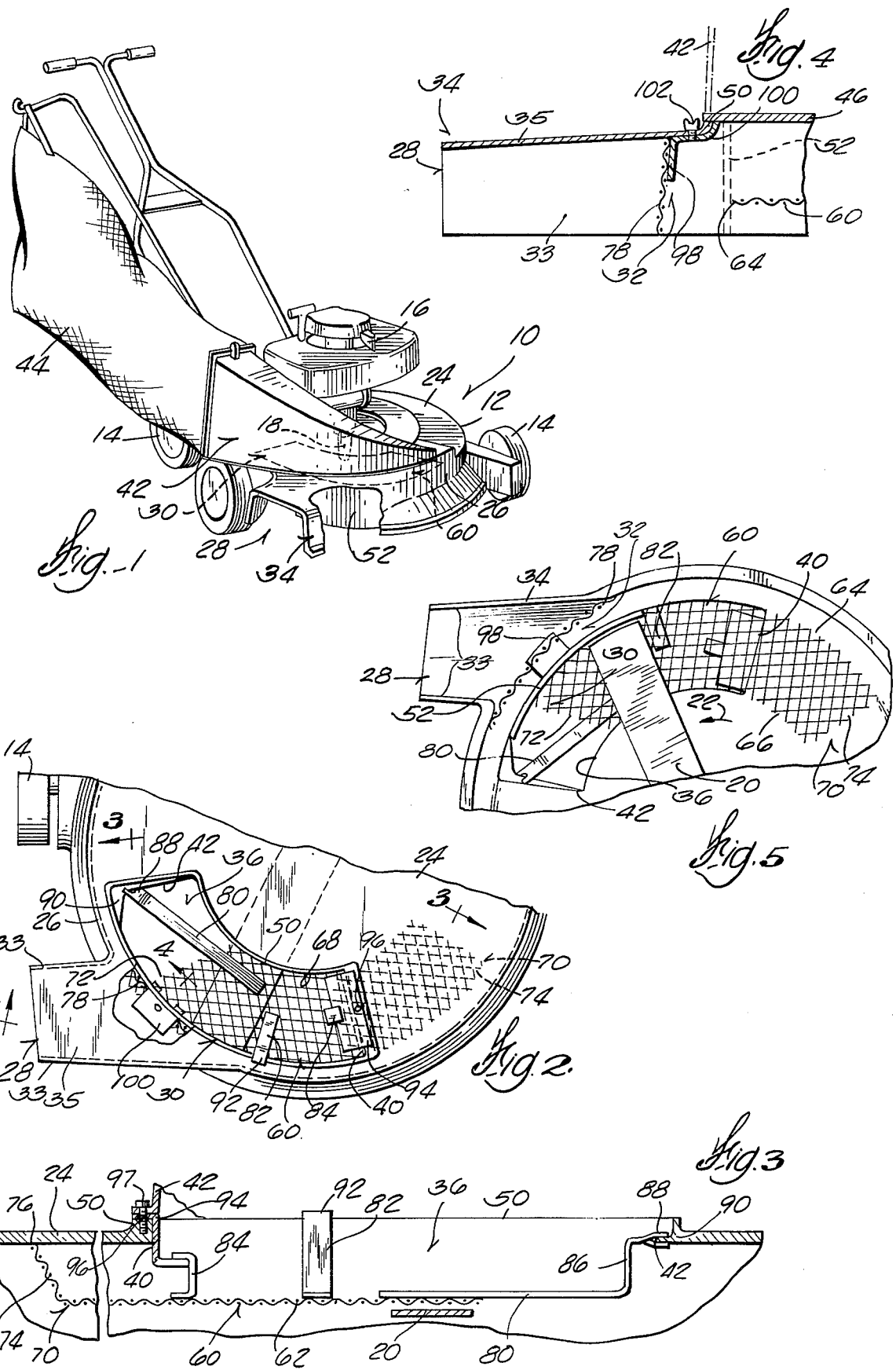

LEAF SHREDDING MEANS FOR ROTARY MOWERS

BACKGROUND OF THE INVENTION

This invention relates to rotary mowers and, more particularly to rotary mowers including means for assisting the cutter blade in comminuting leaves and the like prior to being discharged from the blade housing.

Fallen leaves from trees, shrubs, etc. are an excellent source of mulching material for lawns, flower beds, gardens and the like. To improve the effectiveness for this purpose, it is desirable to pulverize or shred the leaves into a smaller particle size. Also, leaves are commonly collected for disposal in disposable containers, such as plastic bags. When pulverized or shredded the leaves occupy substantially less volume than in their natural state, thereby reducing the number of disposable containers required.

Because of the "vaccum cleaner" effect produced by the rapidly rotating cutter blade, rotary lawnmowers can be advantageously used for collecting fallen leaves and/or partially comminuting the leaves for dispersal over the lawn. However, the comminution of the leaves and other material provided by the cutter blade is usually not adequate to produce a good mulching material. Therefore, it is desirable to provide a rotary mower with means for comminuting leaves or the like prior to being discharged from the blade housing. An example of a prior arrangement for this purpose is described in the Shaw U.S. Pat. No. 2,791,080, issued May 7, 1957.

SUMMARY OF THE INVENTION

The invention provides a rotary mower including a screen attachment through which passes material, such as leaves and the like, being impelled by the cutter blade towards a discharge outlet in the blade housing, and is thereby shredded or comminuted before being discharged from the blade housing.

More specifically, the invention provides a rotary mower including a blade housing having a top deck and an annular wall depending from the top deck, a discharge outlet in the blade housing, and a screen means mounted adjacent to and extending transversely of the discharge outlet opening directly in the path of material being impelled towards the discharge outlet by the cutter blade.

In the preferred construction, the blade housing includes a discharge outlet in the top deck through which the material can be selectively discharged into a collection unit and a side discharge outlet in the annular wall through which the material can be selectively discharged for dispersal over the ground or lawn. When the comminuted material is to be discharged through the top discharge outlet, a screen including a horizontal portion adapted to extend transversely of the horizontal opening of the top discharge outlet is attached to the blade housing with the horizontal portion thereof located above and in close proximity to the rotational path of the cutter blade. When the comminuted material is to be discharged through the side discharge outlet, a vertical screen adapted to extend transversely of the vertical opening of the side discharge outlet is attached to the blade housing in radially outwardly spaced relationship to the rotational path of the cutter blade.

Also, in accordance with the invention, means are provided for detachably supporting the screens from the margin of the respective discharge outlet opening so that the screens can be conveniently installed and removed through the top discharge opening.

The principal feature of the invention is the provision of the rotary mower including means for comminuting leaves and the like before being discharged from the blade housing.

Another principal feature of the invention is the provision of the rotary mower including a screen attachment which extends transversely of the opening of a discharge outlet directly in the path of the material being impelled towards the discharge outlet by the cutter blade and which functions to shred or comminute the material being forced therethrough by the cutter blade.

Another feature of the invention is the provision of a rotary mower described in the preceding paragraph wherein the screen attachment is supported from the margin of the discharge outlet opening.

Other features and advantages of the invention will become apparent upon reviewing the following detailed description, the drawing, and the appended claims.

BRIEF DESCRIPTION OF THE DRAWINGS

FIG. 1 is a perspective view, partially broken away, of a rotary mower embodying various of the features of the invention.

FIG. 2 is a fragmentary, top plan view, partially broken away, of the mower shown in FIG. 1.

FIG. 3 is a sectional view taken along the line designated 3—3 in FIG. 2.

FIG. 4 is an enlarged sectional view taken along the line designated 4—4 in FIG. 2.

FIG. 5 is a fragmentary, bottom plan view of the mower shown in FIG. 1.

DESCRIPTION OF THE PREFERRED EMBODIMENTS

Before explaining the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

Shown in the drawing is a rotary lawnmower 10 including a blade housing 12 which is supported in spaced relation above the ground and for travel along the ground by a plurality of ground-engaging wheels 14. Supported on the blade housing 12 is a motor 16, such as an internal combustion engine, which includes a drive shaft 18 carrying a cutter blade 20 for rotation through and in a generally horizontal plane within the blade housing 12 in the direction shown by the arrow 22 (See FIG. 5).

Blade housing 12 has a generally horizontally extending upper or top deck 24 located above the cutter blade 20. Depending from the top deck 24 is a generally annular, vertically extending wall 26 which generally surrounds the periphery of the path of the cutter blade 20 and which includes a lower edge located adjacent to or slightly below the horizontal plane of the cutter blade 20.

Blade housing 12 includes two discharge outlets, a side discharge outlet 28 and a top discharge outlet 30. The side discharge outlet 28 includes a generally vertical opening 32 which is provided in the annular wall 26 and an open-bottomed shroud 34 which has opposed side walls 33 and a top wall 35 and which extends generally tangentially from the annular wall 26 in communication with the side discharge opening 32 (See FIGS. 2 and 4).

The top discharge outlet 30 includes a generally horizontal, arcuately extending opening 36 provided in the top deck 24. The top discharge opening 36 is located in spaced but generally angularly adjacent relationship to the side discharge opening 32 with the leading margin 40 of the opening 36 being located slightly in advance of the side discharge opening 32 and the trailing end margin 42 of the opening 36 being located slightly beyond the side discharge opening 32 with respect to the direction of the cutter blade rotation.

As explained in more detail below, the side discharge outlet 28 permits side discharge of grass clippings and/or other comminuted debris from the interior of the blade housing and the top discharge outlet 30, in cooperation with a detachable chute assembly 42, permits rearward discharge of grass clippings and/or other comminuted debris into a collection unit 44 which is removably attached to the chute assembly 42 in the usual manner. While other arrangements can be used, the side discharge outlet 28, the top discharge outlet 30, and the chute assembly 42 are preferably arranged in the manner described in the Shaw U.S. Pat. No. 3,118,267, issued on Jan. 21, 1964, which patent is incorporated by reference.

When side discharge is desired, the top discharge opening 36 is blocked or closed by a removable cover plate 46 (shown fragmentarily in FIG. 4) which is supported on a lip 50 generally defining the top discharge opening 36. When it is desired to collect grass clippings and/or other comminuted debris, the cover plate 46 is removed and the chute assembly 42 is mounted on the blade housing 12 in communication with top discharge opening 36 with the collection unit 44 attached to the chute assembly 42 as shown in FIG. 1. Means are provided for blocking the side discharge opening 32 so that the grass clippings and other comminuted debris is discharged rearwardly through the chute assembly 42 into the grass catcher unit 44. While other arrangements can be used, in the specific construction illustrated, the blocking means comprises a curved baffle 52 (corresponding to baffle 57 shown in FIGS. 3, 5, and 7 of U.S. Pat. No. 3,118,267) extending from the lower portion of the chute assembly 42 in blocking relation to the side discharge opening 32 (See FIG. 1 and phantom in FIG. 1). The cover plate 46 and the chute assembly 42 can be selectively retained or secured in releasable assembly with the blade housing 12 by various means, such as that described in U.S. Pat. No. 3,118,267.

The cutter blade 20 is of conventional design and includes leading cutting edges and trailing vaned edges which upon, rotation of the cutter blade 20, serve to assist in circulating air about the interior of the blade housing 12 so that an air stream entrained with grass clippings and/or other debris is impelled towards either the side discharge opening 32 or the top discharge opening 36, depending upon whether the cover plate 46 or the chute assembly 42 is installed.

To assist the cutter blade 20 in comminuting leaves and other debris there is provided a screen means which extends transversely a discharge outlet opening and is located directly in the path of material being impelled towards the discharge outlet opening so that the material must pass through a screen prior to being discharged from the interior of the blade housing 12. Preferably, such a screen is provided for both the top discharge opening 36 and the side discharge opening 32 so that the comminuted leaves and other debris either can be collected for use as a mulching material for locations other than the lawn or dispersed as a mulching material over the lawn.

Extending transversely of at least a major portion of the top discharge opening 36 is a generally arcuately-shaped screen 60 including a horizontal portion 62 having an outer edge 64 which is shaped to contiguously conform to the inner surface of the annular wall 26 of the blade housing 12 and an inner edge 66 which extends radially inwardly beyond the inner side margin 68 of the top discharge opening 36. To accommodate the installation of the chute assembly 42, the portion of the outer edge 64 of the screen 60 adjacent to the side discharge opening 32 is spaced radially inwardly from the annular blade housing wall 26 to permit the passing of the chute baffle 52 therebetween (See FIG. 4). The horizontal portion 62 of the screen 60 is located above and in close proximity to the path of movement of the cutter blade 20. The leading end portion 70 of the screen 60 extends a substantial distance in the direction counter to the direction of cutter blade rotation beyond a leading end margin 40 of the top discharge opening 36. Thus, the screen 60 is located directly in the path of the material being impelled by the cutter blade 20 toward the top discharge outlet 30.

While the screen 60 can be arranged to transverse the entire circumferential dimension of the top discharge opening 36, in the specific illustration constructed, the trailing end 72 of the screen 60 is spaced some distance in the direction counter to the direction of the cutter blade rotation from the trailing end margin 42 of the top discharge opening 36 so as to facilitate installation of the screen through the top discharge opening 36 as described below in more detail. In order to prevent material from escaping above the screen 60, the leading end portion 70 of the screen 60 preferably terminates in an upturned skirt section 74 having a top margin 76 located in closely spaced relation to or abutting an under surface of the top deck 24 of blade housing 12.

Extending vertically and transversely of the side discharge opening 32 is a screen 78 which is arranged to fit inside the side discharge shroud 34 against or in closely spaced relation to the side walls 33 and the top wall 35. The screen 78 is located adjacent to the side discharge opening 32 and radially spaced outwardly from the outer periphery of the rotational path of the cutter blade 20. Thus, the screen 78 is located directly in the path of material being impelled by the cutter blade 20 towards the side discharge outlet 28.

The openings of the screens 60 and 78 are sized and arranged in a manner so that materials, particularly dry materials such as leaves, forcibly driven therethrough by the action of the cutter blade 20 will be shredded, i.e., reduced to particles of relatively small size. The screen openings are made large enough to prevent clogging. The screens 60 and 78 are preferably made from an expanded metal in order to take advantage of the inherently sharp surface edges of such a material.

The screens 60 and 78 are preferably detachably mounted to the blade housing 12 so they can be removed for normal mowing operations. In accordance with one feature of the invention, means are provided for detachably mounting the screens 60 and 78 on the blade housing 12 whereby the screens can be conveniently installed and removed through the top discharge opening 36 (after either the chute assembly 42 or the cover plate 46 has been removed).

While other arrangements can be used, in a specific construction illustrated, top discharge screen 60 is provided with a support arm 80 extending from the trailing edge 72 of the screen 60, a side support bracket 82 extending vertically from the outer edge 64 of the screen 60, and an end support bracket 84 extending vertically from a portion of the screen 60 adjacent to the leading end margin 40 of the top discharge opening 36. Provided on the outer end of the support arm 80 is an upturned portion 86 having a forked section 88 which is adapted to straddle a ledge 90 defining the trailing end margin 42 of the top discharge opening 36. The side support bracket 82, at the upper end, has an inverted U-shaped portion 92 which is adapted to fit over and rest on a portion of the blade housing lip 50 defining the outer side margin of the top discharge opening 36. The end support bracket 84, at the upper end, has an outturned flange 94 which is adapted to rest on the portion of the blade housing lip 50 defining the leading end margin of the top discharge opening 36.

Thus, the screen 60 is supported from the margin of the top discharge opening 36 and is held in place by either the chute assembly 42 or the cover plate 46 depending upon which is being used. In order to further secure the screen 60 in place, the flange 94 of the end support bracket 84 can be provided with an aperture 96 for receiving a mounting bolt 97 used for fastening the chute assembly 42 or the cover plate 46 to the plate housing 12 (See FIGS. 2 and 3).

Provided on the side screen 78 is a support bracket 98 including a flange 100 which is adapted to rest against an under surface of the top wall 35 of the side discharge shroud 34. Screen 78 is removably fastened to the shroud 34 by a wing screw 102 which passes through the top wall 35 of the shroud 34 and is threaded into the support bracket flange 100 (See FIG. 4). In order to facilitate the installation of the chute assembly 42 with the side screen 78 installed, the support bracket 100 is preferably arranged so that the side screen 78 is spaced radially outwardly a small distance from the side discharge opening 32.

The screen 60 can be conveniently installed through the top discharge opening 36 (after removal of the chute assembly 42 or the cover plate 46) by first inserting the leading end portion 70 into the opening, rotating the screen 60 (counterclockwise as viewed in FIG. 2) until the forked section 88 of the support arm 80 straddles the ledge 90, and then moving the side support bracket 82 and the end support bracket 84 into place. If the shredded or comminuted material is to be collected, the chute assembly 42 is then installed over the top discharge opening 36 and is then fastened to the blade housing 12 in the usual manner. If the shredded or comminuted material is to be dispersed over the lawn, the side screen 78 is inserted through the open top discharge opening 36, guided into place inside the shroud 34 and fastened to the shroud top wall 35 by installing the wing screw 102. The cover plate 46 is then installed over the top discharge opening 36 and fastened to the blade housing 12 in the usual manner.

The side screen 78 can be used alone when the shredded or comminuted material is to be dispersed over the lawn. However, in order to maximize the shredding or comminution provided, the use of both the top screen 60 and the side screen 78 is preferred. Since the side screen 78 is located inside the shroud 34 and is spaced radially outwardly from the side discharge opening 32, it does not have to be removed when the chute assembly 42 is installed. Thus, with both the screens 60 and 78 installed, the mower can be expeditiously changed back and forth from spreading to collecting the shredded or comminuted material by simply installing the chute assembly 42 or the cover plate 46.

Various of the features of the invention are set forth in the following claims.

What is claimed is:

1. A rotary mower including a blade housing having a top deck and an annular wall depending from said top deck, a horizontal, arcuately-extending discharge outlet located in said top deck, a cutter blade mounted for rotary movement inside said blade housing and in a direction to impell material toward said discharge outlet, and a screen mounted on said housing and located below and in transverse relation to said discharge outlet and including a horizontal portion extending horizontally above and in close proximity to the rotational path of said cutter blade.

2. A rotary mower according to claim 1 wherein said screen comprises an expanded metal and has openings with sharp edges which cooperate said cutter blade to shred the material being impelled towards said discharge opening.

3. A rotary mower according to claim 1 wherein said horizontal outlet includes a leading end margin, and said horizontal screen portion includes an end portion which extends in a direction counter to the direction of the cutter blade movement beyond the leading end margin of said horizontal outlet and terminates in an upturned skirt, said skirt having an upper margin located adjacent to the underside of said top deck.

4. A rotary mower according to claim 3 wherein said horizontal outlet includes a trailing end margin and opposed side margins, said horizontal portion includes a trailing end opposite to the end having said skirt, and said screen includes a support arm which extends from the trailing end of said screen and is adapted to detachably support said screen from the trailing end margin of said horizontal outlet, a support bracket which extends vertically upwardly from the horizontal portion of said screen and is adapted to detachably support said screen from one of the side margins of said horizontal outlet, and a support bracket which extends vertical upwardly from the horizontal portion of said screen and is adapted to detachably support said screen from the leading end margin of said horizontal outlet.

5. A rotary mower according to claim 3 wherein said blade housing includes a vertical discharge outlet in said annular wall, a shroud extending tangentially from said blade housing in communication with said vertical discharge outlet, screen means extending transversely of said vertical discharge outlet and including a support bracket, and means detachably fastening said support bracket to said shroud.

6. A rotary mower including a blade housing having a top deck and an annular wall depending from said top deck, a first horizontal, arcuately extending discharge outlet in said top deck, a second vertically extending discharge outlet in said annular wall, a cutter blade mounted for rotary movement inside said blade housing, means for selectively detachably connecting to said housing a cover for closing said first discharge outlet, means for selectively detachably connecting to said housing a baffle for blocking said second discharge outlet, a first screen means extending transversely of said first discharge outlet and including a horizontal portion which extends above and in close proximity to the rotational path of said cutter blade, means detachably supporting said first screen means from the margin of said first discharge outlet, a second screen means extending transversely of said second discharge outlet and located in radially spaced relationship to the rotational path of said cutter blade, and means detachably mounting said second screen means on said blade housing.

7. A rotary mower according to claim 6 wherein said first discharge outlet includes a leading end margin, and the horizontal portion of said first screen means includes an end portion which extends in a direction counter to the direction of the cutter blade movement beyond the leading end margin of said first discharge outlet and terminates in an upturned skirt, said skirt having an upper margin located adjacent to the underside of said top deck.

8. A rotary mower according to claim 7 wherein said first and second screen means comprise an expanded metal and have openings with sharp edges which cooperate with said cutter blade to shred the material being impelled towards said discharge outlets.

9. A rotary mower according to claim 8 wherein said first discharge outlet includes a trailing end margin and opposed side margins, the horizontal portion of said first screen means includes a trailing end opposite to the end having said skirt, and said means for supporting said first screen means includes a support arm which extends from the trailing end of said first screen means from the trailing end margin of said first discharge outlet, a support bracket which extends vertically upwardly from the horizontal portion of said first screem means from one of the side margins of said first discharge outlet, and a support bracket which extends vertical upwardly from the horizontal portion of said first screen means and is adapted to detachably support said first screen means from the leading end margin of said first discharge outlet.

10. A rotary mower according to claim 9 wherein said second discharge outlet communicates with a shroud extending tangentially from said blade housing, said shroud having a top wall and opposed side walls, said mounting means for said second screen including a support bracket adapted to support said second screen means from the inside of one of said shroud walls at a position spaced outwardly from said second discharge outlet, and means detachably fastening said support bracket to said shroud.

* * * * *